United States Patent [19]
Hedgepeth

[11] Patent Number: 5,692,779
[45] Date of Patent: Dec. 2, 1997

[54] TRAILER WITH EASY CHANGE AXLES

[76] Inventor: Waitus L. Hedgepeth, 3686 Haynes Lennon Rd., Chadbourn, N.C. 28431

[21] Appl. No.: 559,924

[22] Filed: Nov. 17, 1995

[51] Int. Cl.[6] .................................................. B62D 63/06
[52] U.S. Cl. ........................ 280/789; 280/785; 280/769
[58] Field of Search ............................. 280/789, 785, 280/769, 781; 296/181, 182; 224/519, 521; 414/463

[56] References Cited

U.S. PATENT DOCUMENTS

| | | | |
|---|---|---|---|
| 3,520,551 | 7/1970 | Sellers | 280/789 |
| 3,779,580 | 12/1973 | Thalen | 280/164.1 |
| 4,488,735 | 12/1984 | Hehr | 280/789 X |
| 5,256,024 | 10/1993 | Ross | 280/789 X |

FOREIGN PATENT DOCUMENTS

| | | | |
|---|---|---|---|
| 1224509 | 7/1987 | Canada | 280/789 |
| 1575373 | 9/1980 | United Kingdom | 280/789 |
| 2213109 | 8/1989 | United Kingdom | 280/789 |

*Primary Examiner*—Christopher P. Ellis

[57] ABSTRACT

A trailer with easy change axles is disclosed. Such trailer comprises a frame fabricated of tubular steel having parallel side rails and parallel front and rear rails with a transverse stabilizing rail extending from side rail to side rail adjacent to the rear rail. The frame also has a forwardly extending triangular coupling component extending forwardly from the front rail. Arcuate leaf springs extend downwardly from the frame and are coupled thereto on opposite sides of the stabilizing rail. A tubular rear axle support with a hollow rectangular configuration and opposite ends is secured at upper extents to lower extents of the leaf springs. The rear axle support has horizontal apertures extending therethrough adjacent to the opposite ends. A forwardly extending hitch member with a rearward end is secured to the front rail of the frame. A rearward region is secured to the forwardmost portion of the coupling component with a forward end with a vertical aperture extending therethrough. A pair of rear axles is fabricated in a hollow rectangular configuration each with a horizontal aperture extending therethrough adjacent to an interior end and with a wheel and tire rotatably mounted to an exterior end. Two L-shaped locking pins, one for each axle, are positioned through the apertures of the supports and the axles with small holes extending through the pins with associated cotter pins extending through the small holes securing the L-shaped pins in place.

3 Claims, 3 Drawing Sheets

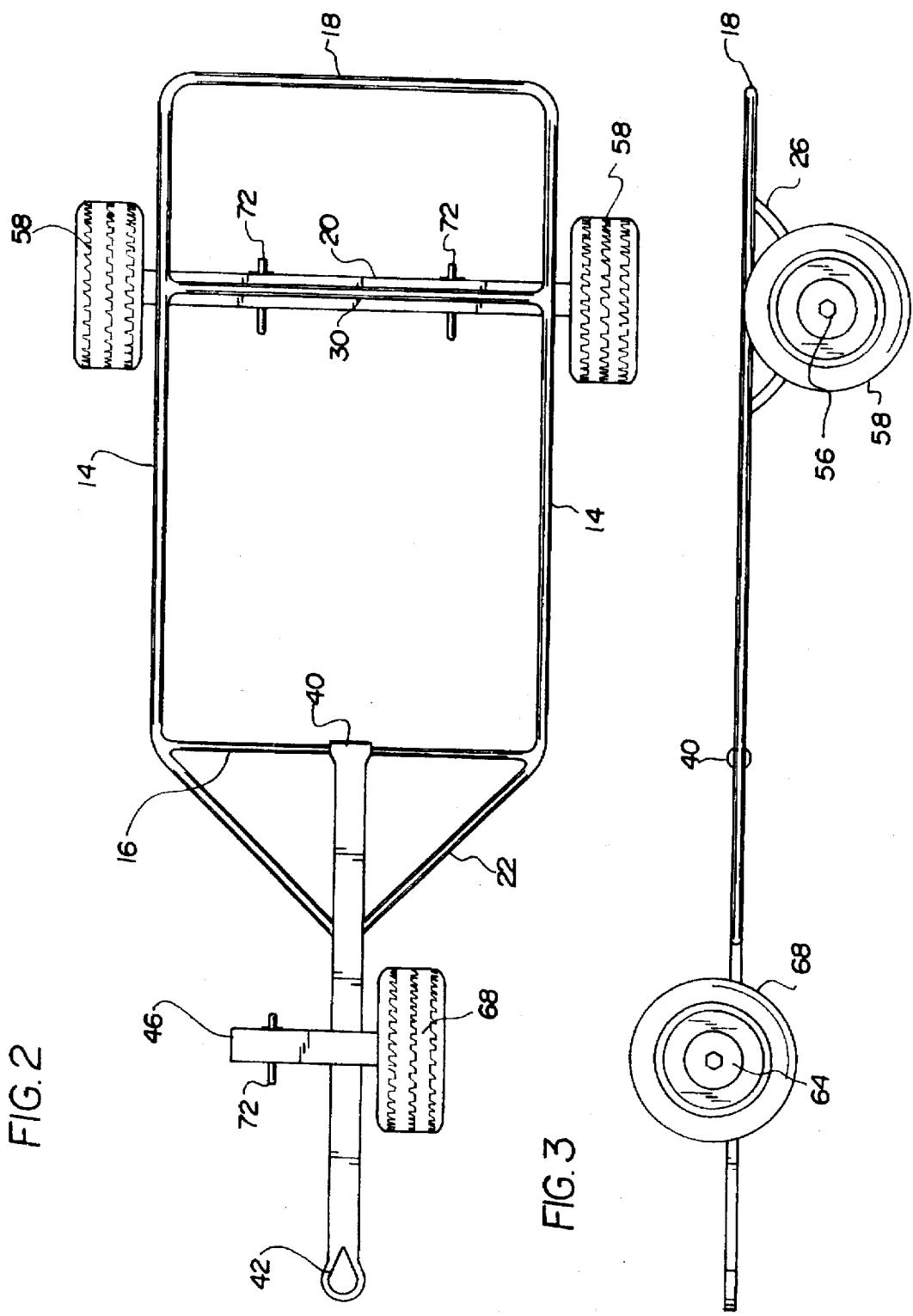

TRAILER WITH EASY CHANGE AXLES

BACKGROUND OF THE INVENTION

1. Field of the Invention

The present invention relates to a new and improved trailer with easy change axles and, more particularly, pertains to changing axles, wheels and tires on a trailer in a quick and easy manner.

2. Description of the Prior Art

The use of trailers with axles, wheels and tires of various designs and configurations is known in the prior art. More specifically, trailers with axles, wheels and tires of various designs and configurations heretofore devised and utilized for the purpose of changing tires and wheels on vehicles through various methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of devices for changing axles, wheels and tires on a trailer in a quick and easy manner. By way of example, U.S. Pat. No. 4,582,448 to Costello et al. discloses portable vehicles having assemblies for allowing the quick release of wheels from such vehicles.

U.S. Pat. No. 5,121,973 to Phillips discloses a push button quick release safety hub assembly.

U.S. Pat. No. 5,226,691 to Kane discloses a three-piece trailer axle with removable spindles.

U.S. Pat. No. 5,269,593 to Wasson discloses an emergency axle apparatus.

Lastly, U.S. Pat. No. 5,328,275 to Winn et al. discloses a unitized wheel hub and bearing assembly.

In this respect, the trailer with easy change axles according to the present invention substantially departs from the conventional concepts and designs of the prior art, and in doing so provides an apparatus primarily developed for the purpose of changing axles, wheels and tires on a trailer in a quick and easy manner.

Therefore, it can be appreciated that there exists a continuing need for a new and improved trailer with easy change axles which can be used for changing axles, wheels and tires on a trailer in a quick and easy manner. In this regard, the present invention substantially fulfills this need.

SUMMARY OF THE INVENTION

In view of the foregoing disadvantages inherent in the known types of trailers with axles, wheels and tires of various designs and configurations now present in the prior art, the present invention provides an improved trailer with easy change axles. As such, the general purpose of the present invention, which will be described subsequently in greater detail, is to provide a new and improved trailer with easy change axles and methods which have all the advantages of the prior art and none of the disadvantages.

To attain this, the present invention essentially comprises a new and improved trailer with easy change axles comprising, in combination, a frame fabricated of tubular steel having elongated parallel side rails and short parallel front and rear rails with a transverse stabilizing rail extending from side rail to side rail adjacent to the rear rail, the frame also having a forwardly extending triangular coupling component extending forwardly from the front rail; arcuate leaf springs extending downwardly from the frame and coupled thereto on opposite sides of the stabilizing rail; a tubular rear axle support with a hollow rectangular configuration and opposite ends secured at upper extents to lower extents of the leaf springs, the rear axle support having horizontal apertures extending therethrough adjacent to the opposite ends; a forwardly extending hitch member with a rearward end secured to the front rail of the frame and with a rearward region secured to the forwardmost portion of the coupling component and with a forward end with a vertical aperture extending therethrough; a tubular front axle support with a hollow rectangular configuration secured to the upper surface of the hitch member between the forward end and the rearward region with a horizontal aperture extending therethrough; a pair of rear axles fabricated in a hollow rectangular configuration each with a horizontal aperture extending therethrough adjacent to an interior end and with a wheel and tire rotatably mounted to an exterior end; a forward axle fabricated in a hollow rectangular configuration with a horizontal aperture extending therethrough adjacent to a first end and a wheel and tire rotatably mounted to a second end; and three L-shaped locking pins, one for each axle positioned through the apertures of the supports and the axles with small holes extending through the pins with associated cotter pins extending through the small holes securing the L-shaped pins in place.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved trailer with easy change axles which has all the advantages of the prior art trailers with axles, wheels and tires of various designs and configurations and none of the disadvantages.

It is another object of the present invention to provide a new and improved trailer with easy change axles which may be easily and efficiently manufactured and marketed.

It is a further object of the present invention to provide a new and improved trailer with easy change axles which is of a durable and reliable construction.

An even further object of the present invention is to provide a new and improved trailer with easy change axles which is susceptible of a low cost of manufacture with regard to both materials and labor, and which accordingly is then susceptible of low prices of sale to the consuming public, thereby making such trailers with axles, wheels and tires of various designs and configurations economically available to the buying public.

Still yet another object of the present invention is to provide a new and improved trailer with easy change axles which provides in the apparatuses and methods of the prior art some of the advantages thereof, while simultaneously overcoming some of the disadvantages normally associated therewith.

Even still another object of the present invention is to change axles, wheels and tires on a trailer in a quick and easy manner.

Lastly, it is an object of the present invention to provide a trailer with easy change axles. Such trailer comprises a frame fabricated of tubular steel having parallel side rails and parallel front and rear rails with a transverse stabilizing rail extending from side rail to side rail adjacent to the rear rail. The frame also has a forwardly extending triangular coupling component extending forwardly from the front rail. Arcuate leaf springs extend downwardly from the frame and are coupled thereto on opposite sides of the stabilizing rail. A tubular rear axle support with a hollow rectangular configuration and opposite ends is secured at upper extents to lower extents of the leaf springs. The rear axle support has horizontal apertures extending therethrough adjacent to the opposite ends. A forwardly extending hitch member with a rearward end is secured to the front rail of the frame. A rearward region is secured to the forwardmost portion of the coupling component with a forward end with a vertical aperture extending therethrough. A pair of rear axles is fabricated in a hollow rectangular configuration each with a horizontal aperture extending therethrough adjacent to an interior end and with a wheel and tire rotatably mounted to an exterior end. Two L-shaped locking pins, one for each axle, are positioned through the apertures of the supports and the axles with small holes extending through the pins with associated cotter pins extending through the small holes securing the L-shaped pins in place.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a top elevational view of the device shown in FIG. 1.

FIG. 3 is a side elevational view of the devices shown in FIGS. 1 and 2.

The same reference numerals refer to the same parts throughout the various Figures.

DESCRIPTION OF THE PREFERRED EMBODIMENT

Figure 1:
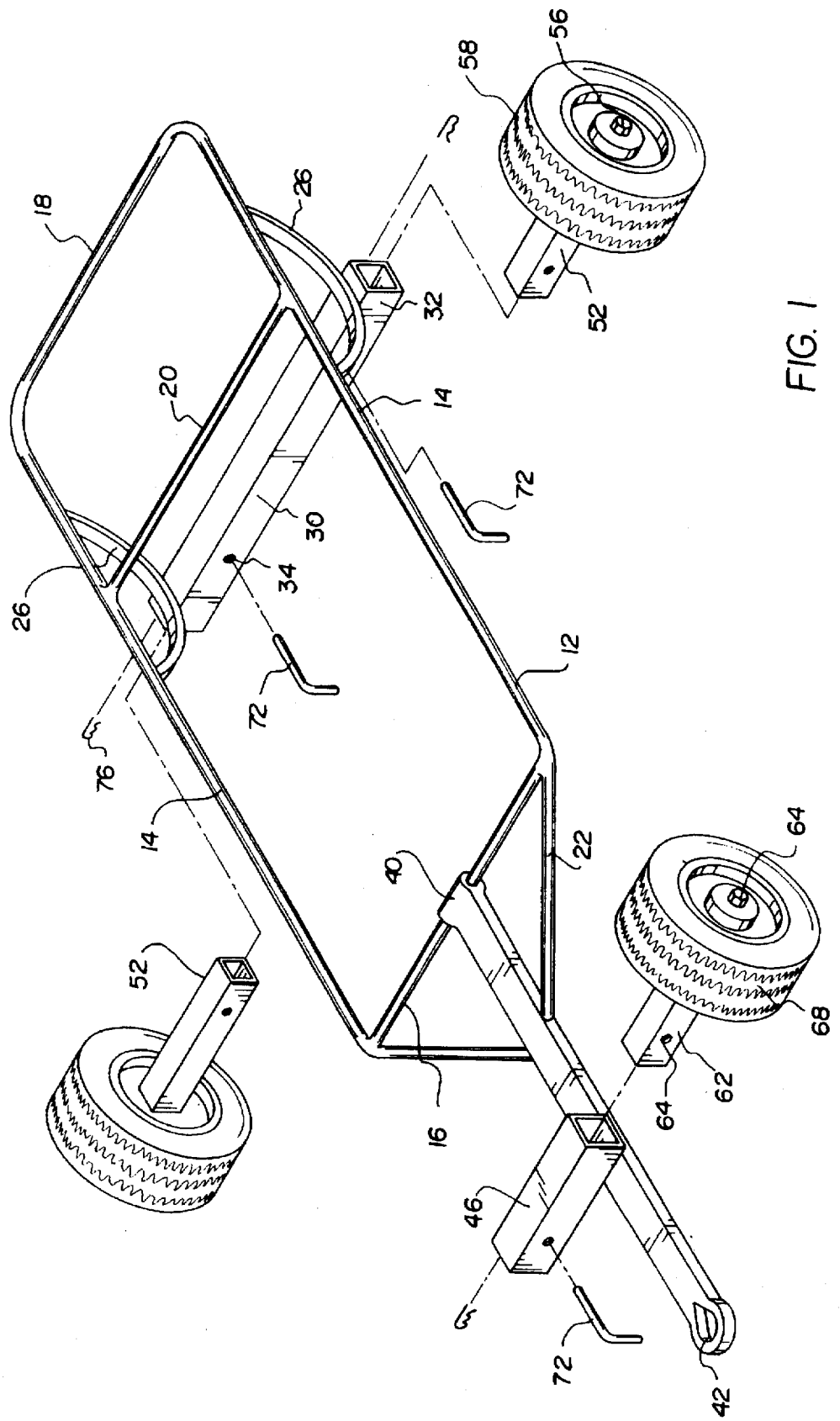
FIG. 1 is a exploded perspective illustration of the preferred embodiment of the new and improved trailer with easy change axles constructed in accordance with the principles of the present invention.
Figure 4:
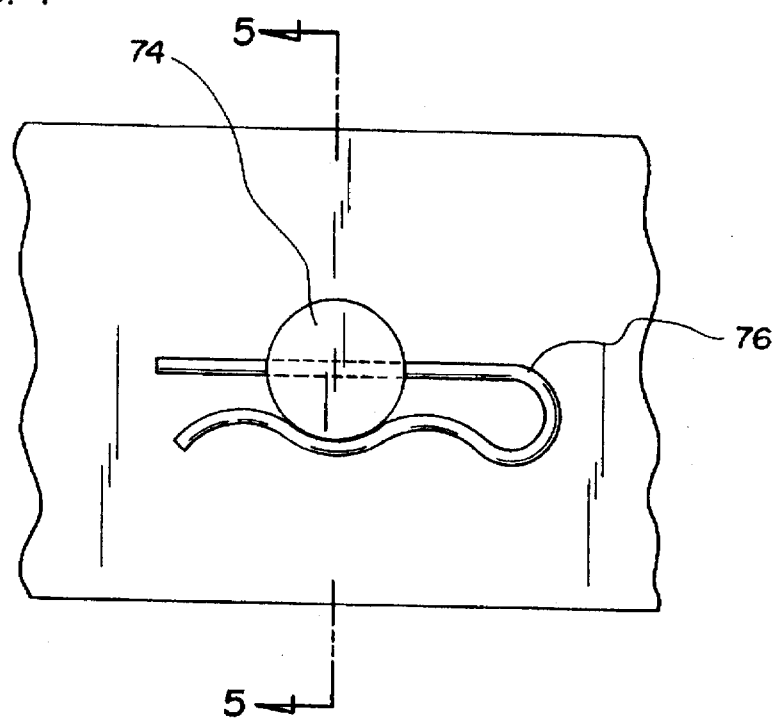
FIG. 4 is an enlarged front elevational view of a locking pin with an associated cotter pin.
Figure 5:
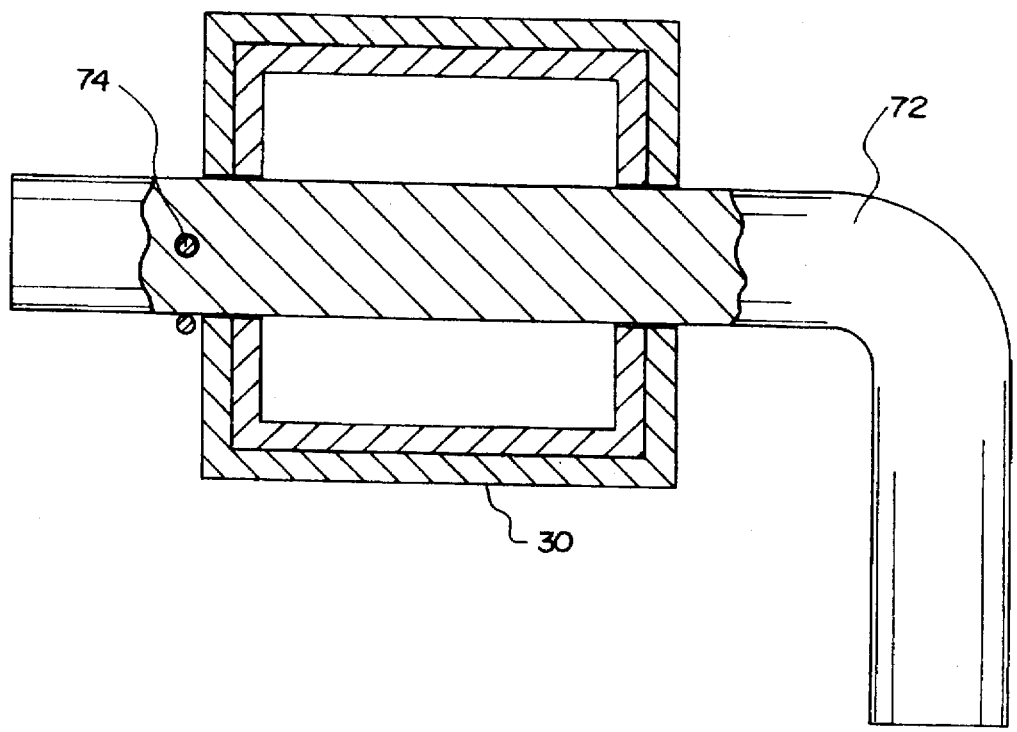
FIG. 5 is a cross-sectional view taken along line 5—5 of FIG. 4.

With reference now to the drawings, and in particular to FIG. 1 thereof, the preferred embodiment of the new and improved trailer with easy change axles embodying the principles and concepts of the present invention and generally designated by the reference numeral 10 will be described.

The present invention, the new and improved trailer with easy change axles is a system 10 comprised of a plurality of components. In their broadest context, the components include a frame, leaf springs, a rear axle support, a forwardly extending hitch member, a front axle support, rear axles, a forward axle and L-shaped locking pins. Each of the individual components is specifically configured and correlated one with respect to the other so as to attain the desired objectives.

More specifically, the system 10 of the present invention, the new and improved trailer with easy change axles, has as its major component a frame 12. The frame is fabricated of tubular steel. It is formed to have elongated parallel side rails 14. It also has short parallel front and rear rails 16,18. It also has a transverse stabilizer rail 20. This stabilizer rail extends from side rail to side rail adjacent to the rear rail. The frame also has a forwardly extending triangular coupling component 22. Such coupling component extends forwardly from the front rail.

Leaf springs 26 are next employed. Such leaf springs are preferably arcuate leaf springs which have their upper ends extending downwardly from the frame whereat they are coupled. They are coupled to the frame on opposite sides of the stabilizer rail and present a lower extent on each spring.

Next provided is a tubular rear axle support 30. Such rear axle support is of a hollow rectangular configuration. It is formed with opposite ends 32. Such rear axle support is secured at its upper extents to the lower extents of the leaf springs. The rear axle support has horizontal apertures 34 extending therethrough. Such apertures are adjacent to the opposite end.

Next provided is a forwardly extending hitch member 38. Such member has a rearward end 40 secured to the front rail of the frame. It also has a rearward region secured to the forward portion of the coupling component. The hitch member also has a forward end with a vertical aperture 42 extending therethrough.

In the preferred embodiment, the system also has a tubular front axle member support 46. Such front axle support is formed in a hollow rectangular configuration. It is secured on its undersurface to the upper surface of the hitch member. Such securement is at a location between the forward end and the rearward region. It is also provided with a horizontal aperture 48 extending therethrough.

In association with the front axle member support is a pair of rear axles 52. Each rear axle is fabricated in a hollow rectangular configuration to fit within the rear axle support. Each rear axle has a horizontal aperture 54 extending therethrough. Such apertures are located adjacent to the interior ends of the rear axle support. In addition, a wheel 56 and a tire 58 are rotatably mounted to an exterior end of each rear axle.

Also in the preferred embodiment, there is provided a forward axle 62. Such forward axle is fabricated in a hollow rectangular configuration. It is formed with a horizontal aperture 64 extending therethrough. Such aperture is located adjacent to a first end. In addition, a front wheel 66 and front tire 68 are rotatably mounted to a second end of the forward axle.

Lastly provided are three L-shaped locking pins 72. One locking pin is provided for each axle. Each locking pin is positioned through the apertures of the supports and axles. In addition, small holes 74 extend through the pins. In association with such small holes are cotter pins 76 which extend through the small holes securing the L-shaped pins in place for operation and use.

The present invention is a wheel and axle assembly for a lightweight trailer, such as a utility or boat trailer, that can be removed and replaced quickly and easily. It is made of steel or another corrosive-resistant metal and consists of wheels, bearings, hubs, and an axle assembly. A center section of the axle assembly is fastened to the underside of a lightweight trailer's frame in its longitudinal center. The axle assembly's center section and two end sections are hollow rectangular tubes that separate from each other. Wheels are fastened to the outside ends of the two end sections. Horizontal holes for lock pins are situated through the end sections and on both ends of the center section. A third wheel and axle end section are mounted to the trailer's tongue, ready for use as a spare when necessary. When assembled, the center and end axle sections are held together by lock pins with keys in their ends.

To remove one wheel and axle end section from the center axle section, simply remove the key from the lock pin holding the two sections together, remove the lock pin, and separate the two axle sections. Remove the spare unit from the trailer's tongue, assemble it to the center axle section and lock it in place with the lock pin.

The present invention enables anyone, mechanically inclined or not, to quickly change a flat tire on a lightweight trailer. The trailer and axle assembly can replace existing wheel and axle assemblies on lightweight trailers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved trailer with easy change axles comprising, in combination:
    a frame fabricated of tubular steel having elongated parallel side rails and short parallel front and rear rails with a transverse stabilizing rail extending from side rail to side rail adjacent to the rear rail, the frame also having a forwardly extending triangular coupling component extending forwardly from the front rail;
    arcuate leaf springs extending downwardly from the frame and coupled thereto on opposite sides of the stabilizing rail;
    a tubular rear axle support with a hollow rectangular configuration and opposite ends secured at upper extents to lower extents of the leaf springs, the rear axle support having horizontal apertures extending therethrough adjacent to the opposite ends;
    a forwardly extending hitch member with a rearward end secured to the front rail of the frame and with a rearward region secured to the forwardmost portion of the coupling component and with a forward end with a vertical aperture extending therethrough;
    a tubular front axle support with a hollow rectangular configuration secured to the upper surface of the hitch member between the forward end and the rearward region with a horizontal aperture extending therethrough;
    a pair of rear axles fabricated in a hollow rectangular configuration each with a horizontal aperture extending therethrough adjacent to an interior end and with a wheel and tire rotatably mounted to an exterior end;
    a forward axle fabricated in a hollow rectangular configuration with a horizontal aperture extending therethrough adjacent to a first end and a wheel and tire rotatably mounted to a second end; and
    three L-shaped locking pins, one for each axle positioned through the apertures of the supports and the axles with small holes extending through the pins with associated cotter pins extending through the small holes securing the L-shaped pins in place.

2. A trailer with easy change axles comprising:
    a frame fabricated of tubular steel having parallel side rails and parallel front and rear rails with a transverse stabilizing rail extending from side rail to side rail adjacent to the rear rail, the frame also having a forwardly extending triangular coupling component extending forwardly from the front rail;
    arcuate leaf springs extending downwardly from the frame and coupled thereto on opposite sides of the stabilizing rail;
    a tubular rear axle support with a hollow rectangular configuration and opposite ends secured at upper extents to lower extents of the leaf springs, the rear axle support having horizontal apertures extending therethrough adjacent to the opposite ends;
    a forwardly extending hitch member with a rearward end secured to the front rail of the frame and with a rearward region secured to the forwardmost portion of the coupling component and with a forward end with a vertical aperture extending therethrough;
    a pair of rear axles fabricated in a hollow rectangular configuration each with a horizontal aperture extending therethrough adjacent to an interior end and with a wheel and tire rotatably mounted to an exterior end; and
    two L-shaped locking pins, one for each axle positioned through the apertures of the supports and the axles with small holes extending through the pins with associated cotter pins extending through the small holes securing the L-shaped pins in place.

3. The apparatus as set forth in claim 2 and further including:

a tubular front axle support with a hollow rectangular configuration secured to the upper surface of the hitch member between the forward end and the rearward region with a horizontal aperture extending therethrough; and a forward axle fabricated in a hollow rectangular configuration with a horizontal aperture extending therethrough adjacent to a first end and a wheel and tire rotatably mounted to a second end.

* * * * *